United States Patent
Buckner, III et al.

(10) Patent No.: US 6,770,823 B2
(45) Date of Patent: Aug. 3, 2004

(54) SYSTEM AND METHOD FOR CHECK-WEIGHING THE CONTENT OF A BLISTER

(75) Inventors: Charles Amick Buckner, III, Durham, NC (US); Milton David Bynum, Lake Villa, IL (US); David Brian Moody, Durham, NC (US); Michael Richard Strong, Durham, NC (US); Thomas Scott Wilson, Durham, NC (US)

(73) Assignee: Smithkline Beecham Corporation, Philadelphia, PA (US)

(*) Notice: Subject to any disclaimer, the term of this patent is extended or adjusted under 35 U.S.C. 154(b) by 10 days.

(21) Appl. No.: 10/203,726

(22) PCT Filed: Feb. 16, 2001

(86) PCT No.: PCT/US01/05277

§ 371 (c)(1),
(2), (4) Date: Aug. 13, 2002

(87) PCT Pub. No.: WO01/60695

PCT Pub. Date: Aug. 23, 2001

(65) Prior Publication Data

US 2003/0062288 A1 Apr. 3, 2003

Related U.S. Application Data

(60) Provisional application No. 60/183,465, filed on Feb. 18, 2000.

(51) Int. Cl.[7] .................. G01G 17/00; G01G 15/00; B65B 1/46; B65B 1/48; B65B 1/30
(52) U.S. Cl. .................. 177/1; 177/50; 177/125; 141/83; 53/502; 53/503; 53/504; 73/1.13
(58) Field of Search .................. 177/50, 125, 145, 177/1; 141/83; 53/502, 504, 503; 73/1.13; 222/55, 56, 77

(56) References Cited

U.S. PATENT DOCUMENTS

| 4,472,922 A | | 9/1984 | Romagnoli .................. 53/53 |
| 4,640,376 A | * | 2/1987 | Hinzpeter .................. 177/50 |
| 4,811,802 A | * | 3/1989 | Yamamoto et al. .......... 177/50 |
| 5,159,959 A | * | 11/1992 | Böhm ...................... 141/83 |
| 5,187,921 A | * | 2/1993 | Wilson et al. ............. 53/502 |
| 5,509,773 A | | 4/1996 | Connor et al. ............ 414/412 |
| 5,555,707 A | | 9/1996 | Schwenger ................ 53/493 |
| 5,750,938 A | * | 5/1998 | DeCaris et al. ............ 177/50 |
| 5,796,051 A | * | 8/1998 | Chiari et al. .............. 177/50 |
| 5,971,038 A | | 10/1999 | Fiedler et al. ............ 141/83 |
| 6,050,057 A | * | 4/2000 | Tuyn et al. ............... 53/504 |
| 6,674,022 B2 | * | 1/2004 | Fermier et al. ............ 177/60 |

FOREIGN PATENT DOCUMENTS

| EP | 0 009 538 A | 4/1980 |
| FR | 2 709 472 A | 3/1995 |

* cited by examiner

Primary Examiner—Randy W. Gibson
(74) Attorney, Agent, or Firm—Robert J. Smith (57) ABSTRACT

A system for check weighing the content of a blister strip which includes a guide adapted to receive a blister strip comprised of at least one blister, a punch aligned with the guide for receiving the at least one blister, an actuator engaged with the punch for driving the punch toward the blister strip, whereby the blister is punched from the blister strip, and a balance adapted to receive the punched blister for weighing the punched blister and generating a weight signal after subtracting a predetermined value representing the weight of an empty blister. An alternative method of determining the content of a blister strip comprises reflecting a beam of energy off of a blister strip and determining the height of the blister from the reflected energy. The measured height is compared to a predetermined height to derive the amount of powder contained therein.

61 Claims, 12 Drawing Sheets

SYSTEM AND METHOD FOR CHECK-WEIGHING THE CONTENT OF A BLISTER

This application is filed under 35 U.S.C. §371 as the United States National Phase Application of International Application No. PCT/US01/05277 filed Feb. 16, 2001 claiming priority from U.S. Provisional Application No. 60/183,465 filed Feb. 18, 2000, the disclosures of which are incorporated herein by reference in their entirety.

TECHNICAL FIELD

This invention relates generally to blister strips used to deliver powdered medication, and more particularly to a system and method for accurately measuring the content contained in the blisters comprising a blister strip.

BACKGROUND ART

Powdered medication for use with Multi Dose Powder Inhalers (MDPI) is provided in blister strips comprised of one or more rows of blisters (indents made in an aluminum foil strip wherein each blister is filled with a metered amount of medication and the powder sealed within the blister by a composite lid foil).

A device is provided for the user that removes the lid foil, thus releasing the powder for use, so that the user can inhale the powdered medication. A variety of ailments can be treated in this manner, particularly asthma. Also, recent developments in antibiotic medications have proven MDPI to be an effective method of introducing the medication into a user's system.

In any case, irrespective of the medical condition being treated, it is critical that each blister contain the correct metered dose of medication to ensure proper treatment of the ailment and protect the user from over-medication or under-medication.

Currently, to ensure that the correct metered dose is being dispensed in each blister, random strips from a production run are tested by weighing each strip, inserting a needle into the individual blisters one at a time, extracting the powder through suction and then re-weighing the strip. Not only is this method time consuming (a strip comprising 120 blisters can typically take up to one hour to test), but the method has within it inherent inaccuracies. For instance, if all the powder is not extracted from each blister, then the weight of the strip after the powder has supposedly been removed will be inaccurate. Moreover, because it is understood and accepted that powder residue is left behind within the blister, a percentage of residual powder is assumed and an additional weight based on that assumed percentage is automatically subtracted from the weight of the empty strip.

Accordingly, because it is essential that the powder medication be dispensed in the correct metered dose, it is essential that the powder contained in each blister be accurately measured to ensure proper dosage.

SUMMARY OF THE INVENTION

This invention results from the realization that a truly effective system and method for accurately measuring a dose of powdered medication contained in a blister for use in a metered dose powder inhaler can be achieved in which the powder filled blister is punched from a blister strip without breaking the blister, to prevent loss of powder weight, and the punched blister is weighed. A predetermined weight, representing the weight of an empty blister, is subtracted from the weight of the punched blister to determine the weight of the powder dose contained in the punched blister.

The invention results from the further realization that the correct size of a blister can be verified by measuring the maximum height of the blister and comparing it to a predetermined height to determine whether the blister is the correct size for receiving, and thus dispensing, a predetermined dose of medication.

The invention results still further from the realization that a blister can be accurately punched without breaking the blister. This is accomplished by monitoring the profile of the blister whereby the center of the blister is determined. The blister is advanced a predetermined distance based on the blister's center to the punch such that the blister is accurately aligned beneath the punch. The foil strip or blister strip is then punched from the strip without breaking the blister.

This invention features a system for check-weighing a metered dose powder inhaler blister. The system comprises a guide adapted to receive a blister strip having at least one blister, a punch aligned with the guide for receiving the at least one blister, and an actuator engaging the punch for driving the punch toward the blister strip whereby the blister is punched from the blister strip. A balance adapted to receive the punched blister is provided for weighing the punched blister and generating a punched blister weight for the at least one blister.

In one embodiment of the present invention there can be a computer controller, responsive to the balance, for subtracting a predetermined weight from the punched blister weight. A drive assembly can be included, responsive to the blister strip, for advancing the at least one blister toward the punch. The drive assembly can include a drive wheel adapted to engage a first side of the blister strip for advancing the at least one blister toward the punch and a friction wheel adapted to engage a second side of the blister strip opposite the first side for urging the blister strip toward the friction wheel to ensure the friction wheel properly engages the blister strip. The drive assembly can include a stepper motor responsive to the computer controller for engaging the drive wheel to advance the at least one blister a predetermined distance toward the punch.

A sensor can be provided, aligned with the guide and responsive to the at least one blister, for detecting the profile of the at least one blister. The sensor can include an energy source for directing a beam of energy toward the blister strip and a detector for receiving a beam of reflected energy from the blister strip. The energy source can include a light source, which can be a laser. The guide can include a spring for urging the blister trip into the guide to ensure the profile of the blister is accurately detected. The guide can further include a hole through which the beam of energy passes to prevent a beam of reflected energy from being detected in the absence of a blister strip within the guide. The punch can include a clamp such as a stripper plate, responsive to the actuator, for holding the blister strip within the guide as the blister is being punched from the blister strip to ensure a clean punch. The punch can also include a contoured tip for seating the blister within the punch as the blister is being punched from the blister strip to ensure that the blister is not broken when punched, the tip engaging the blister strip at an oblique angle. The actuator can include a fluid driven actuator which can be an air cylinder.

The invention also features a method for weighing the content of a blister in a blister strip. The method includes punching a blister containing a metered content from a blister strip, weighing the punched blister to determine a punched blister weight and subtracting from the punched blister weight a predetermined weight and representing the weight of an empty blister to determine a weight representative of the metered content.

In one embodiment the step of punching can include punching the blister from the blister strip without breaking the blister. The method can also include the steps of punching a blank from the blister strip and weighing the blank to produce the predetermined weight. The method can also include the step of measuring the height of the blister prior to punching the blister and detecting the center of the blister to facilitate alignment of the blister for punching. The step of detecting the center can include calculating first and second slopes of respective first and second blister sides to generate a blister profile and detecting the midpoint, or center, of the blister profile which represents the center of the blister.

The invention further features a method for detecting defects in a blister strip blister. The method includes directing a beam of energy from an energy source toward a blister strip containing at least one blister, moving the blister strip in alignment with the beam of energy such that the at least one blister passes through the beam of energy, and receiving beams of reflected energy from the blister strip. The maximum height of the at least one blister is determined from the reflected beams of energy and compared to a predetermined height.

The invention features still further a method for aligning a blister strip blister with a punch. The method includes directing a beam of energy from an energy source toward a blister strip containing at least one blister, moving the blister strip toward a punch in alignment with the beam of energy such that the at least one blister passes through the beam of energy. Reflected beams of energy from the blister strip are received and the center of the blister is detected. The blister is moved, in response to the detected center, a predetermined distance toward the punch so that the blister is accurately aligned with the punch.

In one embodiment the step of detecting the center can include calculating first and second slopes of respective first and second sides of the blister to generate a blister profile and detecting the midpoint of the blister profile which represents the center f the blister. The step of detecting the center can also include detecting the maximum height of the blister.

Finally, the invention features a system for aligning a blister strip blister with a punch including an energy source for directing a beam of energy toward a blister strip containing at least one blister, a drive assembly for moving the blister strip in alignment with the beam of energy such that the at least one blister passes through the beam of energy and a detector for receiving beams of reflected energy from the blister strip. There are means for detecting the center of the at least one blister from the reflected beams of energy. The drive assembly, in response to the detected center, moves the blister a predetermined distance, the distance from the sensor to a punch, toward the punch so that the blister is aligned with the punch.

In one embodiment the means for detecting can include means, responsive to the detector, for calculating first and second slopes of respective first and second sides of the blister and generating a blister profile and means, responsive to the means for calculating, for determining the midpoint of the blister profile which represents the center of the blister. The means for detecting the center can include means, responsive to the detector, for detecting the maximum height of the blister which represents the center of the blister.

It is therefore an object of the present invention to provide a system and method that accurately and efficiently weighs the amount of powder contained in a blister strip blister.

It is a further object of the present invention to provide such a system and method that detects defects in a blister strip blister.

It is still a further object of this invention to provide such a system and method that accurately aligns a blister with a punch to punch the blister without breaking the blister.

DETAILED DESCRIPTION OF THE INVENTION

Figure 1:
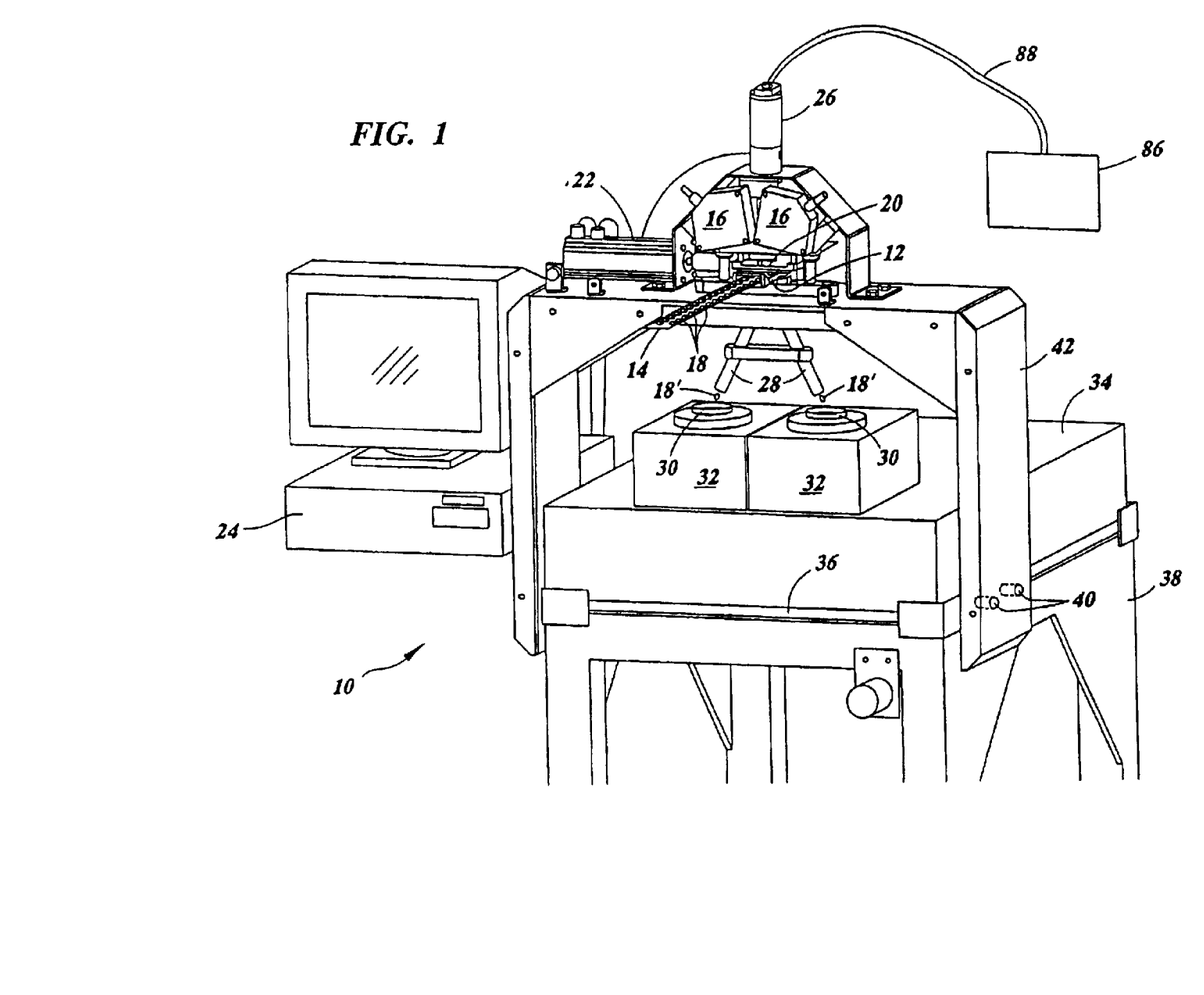
FIG. 1 is a detailed three dimensional view of the check-weighing system for accurately weighing the powder contained in the blisters of a blister strip according to the present invention.

There is shown in FIG. 1 a check-weighing system, generally designated 10, for check-weighing a metered dose of powder medication according one embodiment of the present invention. Check-weighing system 10 includes a guide 12 for receiving a blister strip 14 and a sensor 16 that detects the height of individual blisters 18 that comprise blister strip 14 and which are filled with a metered content, for example a metered dose of powdered medication.

Guide 12 is aligned with a punch generally designated 20. A drive assembly 22 can be controlled by a computer controller 24, in response to sensor 16 to advance blister strip 14 through guide 12 toward punch 20. An actuator 26 drives punch 20 to punch individual blisters 18 from blister strip 14. Individual punched blisters 18' fall through chutes 28 into respective pans 30, for example disposable lightweight foil pans, that are placed on respective balances 32. Balance 32 weighs the punched blisters 18' to provide a punched blister weight.

Balance 32, for example an SAG 245 available from Mettler Toledo, Inc. of Columbus, Ohio, is extremely sensitive and must therefore be permitted to settle before each punched blister weight can be measured This can typically take up to four seconds. Individual punched blisters 18' can be weighed one at a time to determine which, if any, are under weight or over weight for a particular powder dose. Although not a requirement of the present embodiment, balance 32 can be zeroed after each punch weight is measured so that the individual weight of a subsequent punched blister 18' can be accurately measured. However, weighing each punched blister 18' individually and zeroing balance 32 are not necessary limitations of the invention as all the individual blisters 18 can be punched from blister strip 14 before a punched weight is determined.

In any case, once the weight of punched blister 18' is measured, computer controller 24, which may include for example a processor such as, for example, a Pentium® type processor available from Intel Corporation of Santa Clara, Calif., subtracts a predetermined weight (representing the weight of the foil and paper that comprise the blister) from the punched weight to yield the actual weight of the metered dose contained within punched blister 18'. The predetermined weight can be determined by first punching a blank from blister strip 14 before the first blister 18 is punched. While this is the most accurate way to determine the powder weight according to the present invention, since the blank is a true representation of the weight of the composite lid foil that comprise blister 18, this is not a necessary limitation of the invention as a predetermined weight representing an average composite lid foil weight can also be used.

System 10 according to the present invention can typically punch a blister strip containing 120 blisters (two rows of 60 blisters) in four minutes, based on a four second settling time for balance 32. This speed compares favorably to over an hour with the method of the prior art as discussed in the Background Art above. Moreover, the present invention provides a much more accurate measurement and can determine whether individual blisters are under/over weight while the prior art method only measured the powder weight of an entire strip. The system of the present invention can further generate a blister strip profile identifying which blisters, if any, are under or over the required height.

As discussed above, the predetermined weight of the composite lid foil can be determined for each strip by punching a blank (not shown) from blister strip 14 before the powder filled blisters 18 are punched, e.g., punching the flat portion of strip 14 that is introduced first into guide 12 which does not contain blisters. In this way, variations in the thickness of the aluminum foil and paper that make up blister strip 14 need not be accounted for and no assumptions that can affect the weight of the metered dose of powder need be made. However, an average weight for a blank can be predetermined and used for all strips although the accuracy of the check-weighing can be affected.

Balance 32 rests on a balance surface 34, for example a marble block, Part Number 2245A44, available from McMaster-Carr of Atlanta, Ga., that is sufficiently heavy so that balance 32, given its sensitivity, is not unduly affected from external environmental vibrations. To further isolate balance 32 from external vibrations a shock absorbing layer 36, for example a neoprene rubber pad, Part Number 5996K24, also available from McMaster-Carr of Atlanta, Ga., can be provided between balance surface 34 and frame 38. To isolate balance 32 from vibrations from punch 20, neoprene bushings 40 (shown in phantom) can be provided between frame 38 and legs 42.

Figure 2:
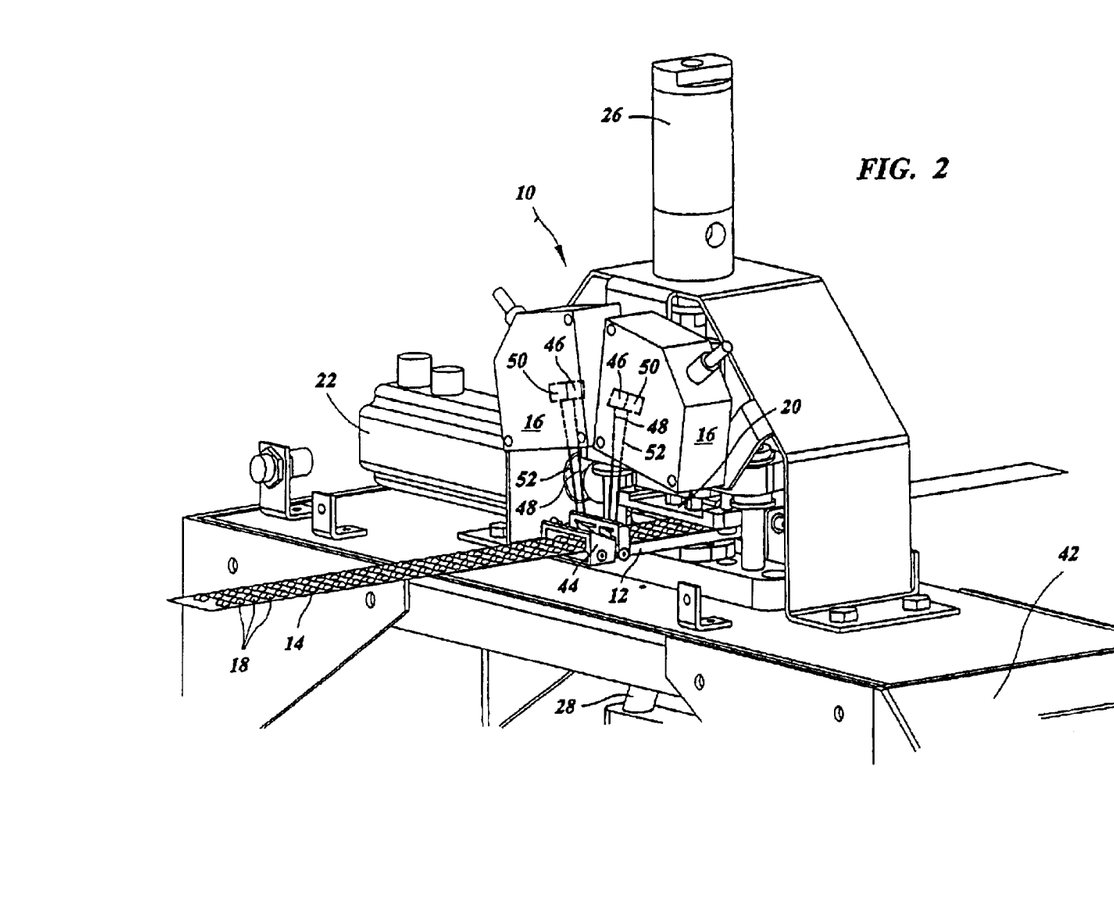
FIG. 2 is an enlarged three dimensional view of the sensor and the guide of the check-weighing system of FIG. 1.

Guide 12, as shown in FIG. 2, includes an entry guide 44 for funnelling blister strip 14 into guide 12. Sensor 16, for example a Model LB-041 laser micrometer available from Keyence Corporation of Atlanta, Ga., can be used to detect the height of blister 18. Sensor 16 includes an energy source 46, shown in phantom, for example a light source, that directs a beam of energy 48, such as a laser beam, toward blister 18. Sensor 16 also includes a detector 50, shown in phantom, that receives a beam of reflected energy 52 from blister strip 14. However, the sensor described above is not a necessary limitation of the invention as individual energy sources and detectors that include infrared sensors, sonic sensors as well as contact sensors readily apparent to those skilled in the art can also be used without departing from the scope of the present invention. Moreover, while beams 48 and 52 are represented in the drawings as two distinct beams, rather than co-linear beams, this is for illustrative purposes only. The proximity of source 46 and detector 50 will dictate the alignment of beams 48 and 52, e.g. coplanar or non-coplanar.

Using laser micrometer 16, the slopes of first and second sides, e.g., the front and back sides, of a blister are measured. Computer controller 24 uses the recorded heights to determine the slope of the front and back surfaces of blister 18. The intercept of the respective slopes and base foil of blister strip 14 are calculated and a blister profile is generated. The blister profile represents a cross section of blister 18 having a blister width defined by the intercepts of the respective slopes with blister strip 14. The midpoint of the blister profile is determined and represents the center of blister 18. The center point is then used as the reference point for advancing blister 18 to punch 20, accurately aligning blister 18 within punch 20, such that the blister 18 is located under the punch. This eliminates problems due to asymmetrical blisters. Alternatively, the maximum height can be detected as the maximum height is where the slopes change from positive to negative and is typically the center of the blister.

Figure 3:
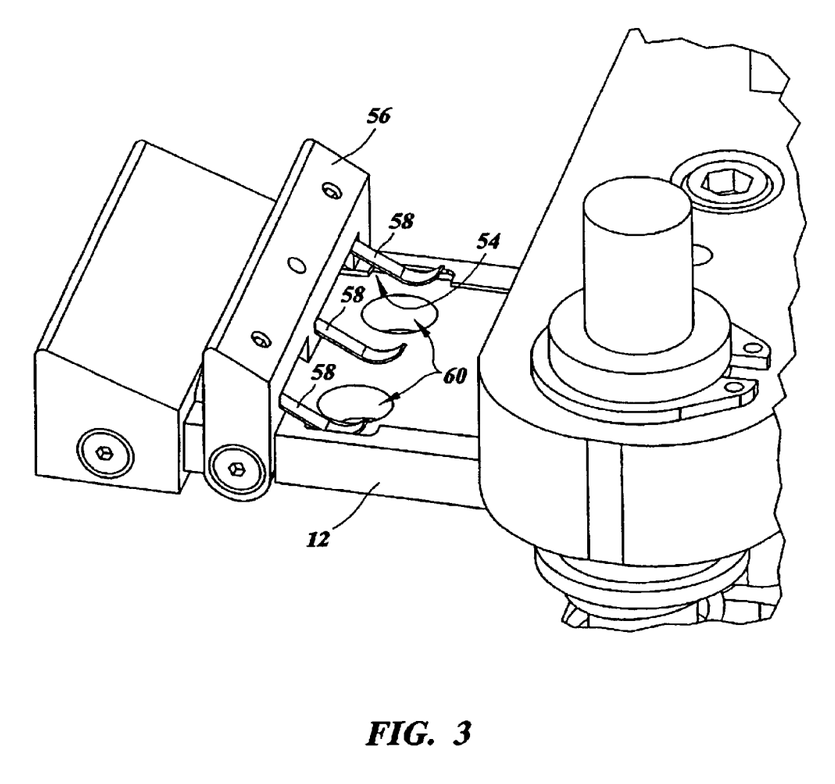
FIG. 3 is an enlarged three dimensional view of the guide of FIG. 2.

In order to ensure that the profile of blister 18 is accurately measured, guide 12 can include a channel 54, as shown in FIG. 3, for receiving the edges of blister strip 14 to maintain blister strip 14 flat within guide 12. Guide 12 can further include a spring holder 56, as shown in FIG. 3, which includes springs 58 (such as, for example, leaf springs) for holding blister strip 14 flat within guide 12. Individual blisters 18 pass between springs 58 so that blisters 18 will not strike springs and be deformed, which would prevent accurate profile determination. It will be readily apparent to those skilled in the art that as few or as many springs 58 should be used as are required to keep blister strip 14 flat within guide 12, and thus depends on the number of rows of blisters 18 on blister strip 14. Guide 12 can be provided with passageways or holes 60 through guide 12 so that energy beam 48, such as a laser beam, will pass through guide 12 in the absence of blister strip 14. Accordingly, computer controller 24 can be programmed so that drive assembly 22 remains idle until a beam of reflected energy 52 is detected. Moreover, computer controller 24 can further be programmed to stop system 10 when no more beams of reflected energy 52 are detected after the last blister 18 is punched.

Figure 4A:
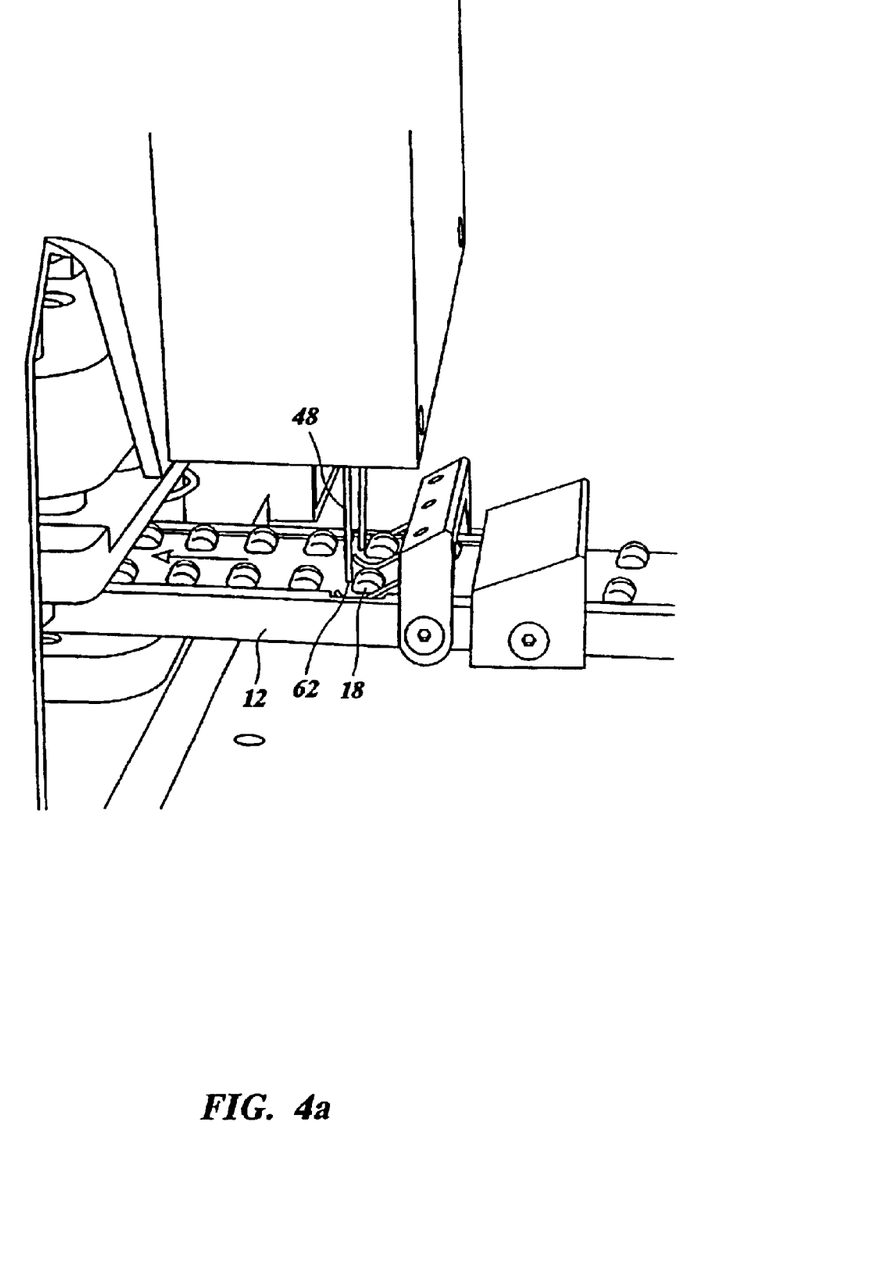
FIGS. 4A–4D are detailed three dimensional views demonstrating the detection of the peak of the blister according to one aspect of the present invention.

Referring now to FIG. 4A, the height of blister 18 is detected by directing beam 48 toward blister strip 14. As blister strip 14 is advanced through guide 12, in the direction as indicated by the arrow, a beam of reflected energy 52 is reflected from blister 18 at a point or base 62 and the height at that point is detected. Because base 62 is not a portion of blister 18, but is instead a flat portion of blister strip 14, base 62 is a zero reference point.

Figure 4B:
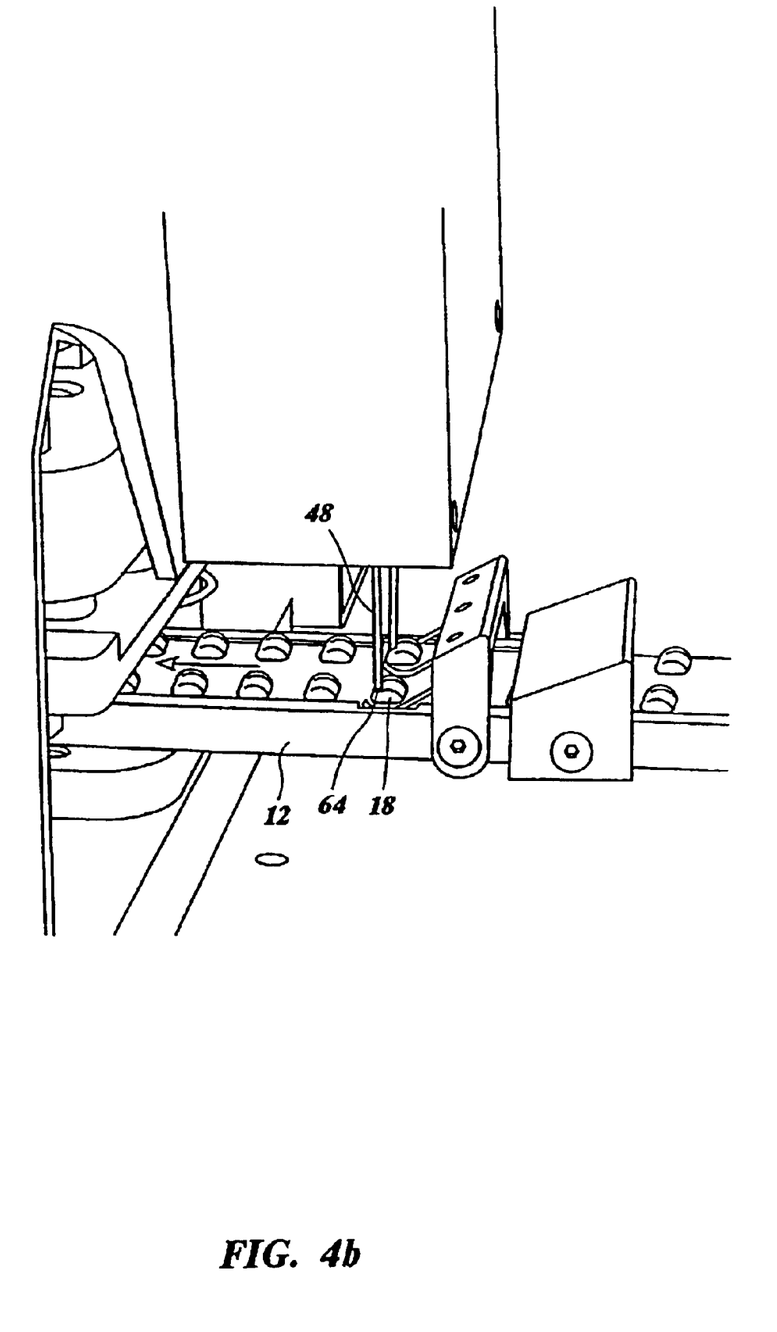

Blister 18 is aligned with and passes through beam 48, as shown in FIG. 4B, and beam 48 continuously strikes blister 18, for example at a point 64. Point 64 is higher than the previously detected height at base 62 indicating that a blister has been detected. The height of blister 18 is continuously measured as blister 18 passes through beam 48. Computer controller 24 (FIG. 1) determines from the reflected beam the instantaneous height detected from blister 18 and calculates a front slope.

Figure 4C:
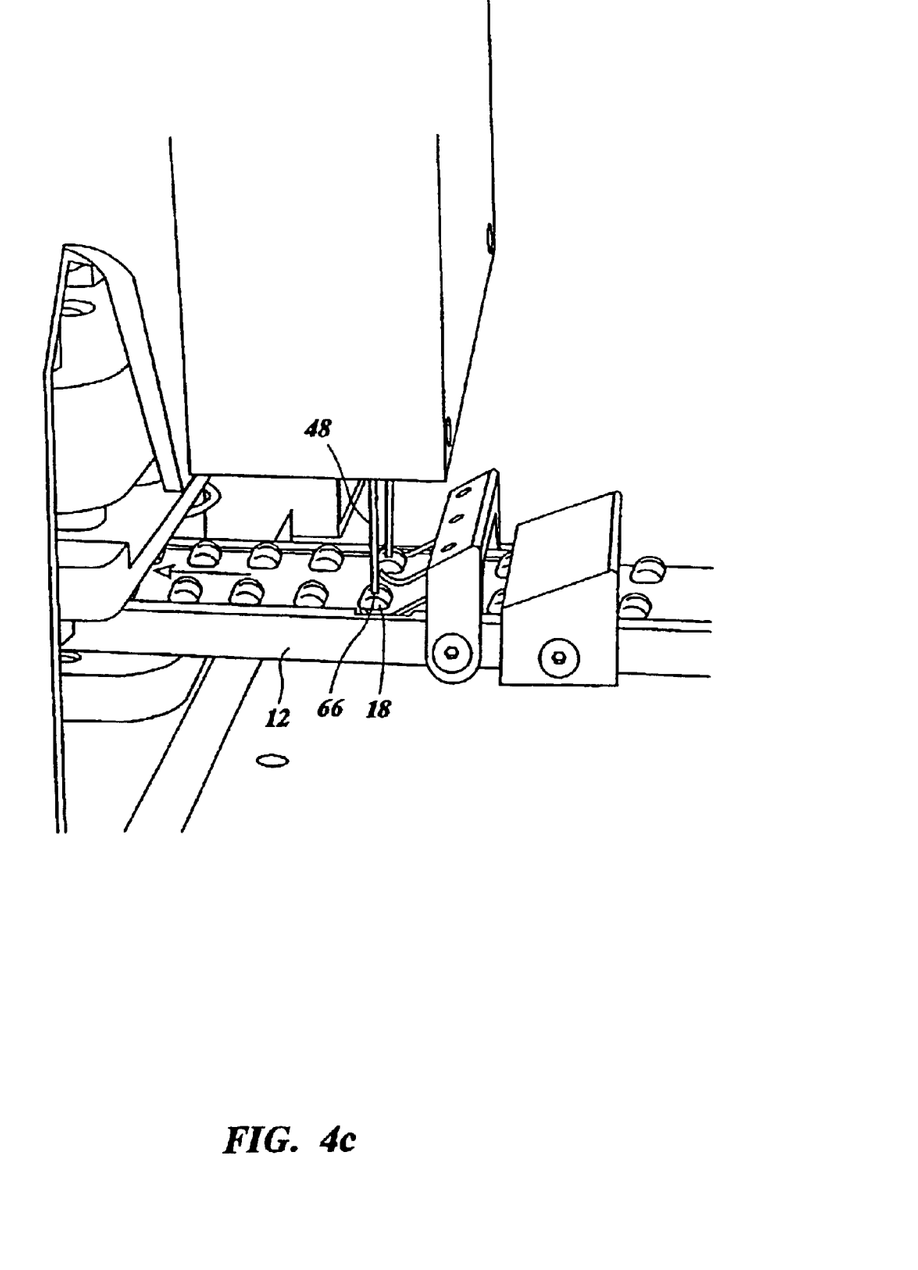

As shown in FIG. 4C, beam 48 strikes blister 18 at a point 66 which is the apex or peak of blister 18, that is, point 66 is thus higher that any previously measured point. However, thus far computer controller 24 is merely detecting the height of blister 18 continuously and has not yet determined that a peak has been detected.

Figure 4D:
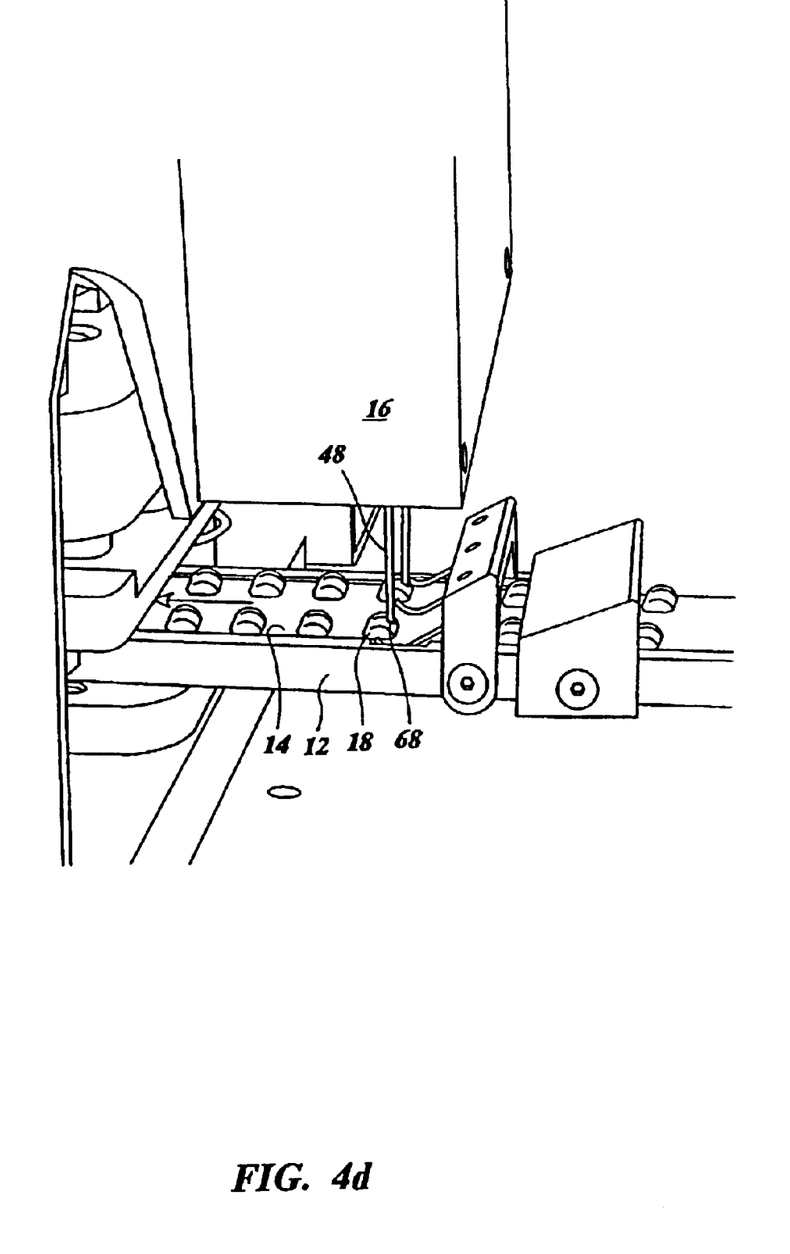

Next, as shown in FIG. 4D, beam 48 strikes blister 18 at a point 68 that is lower than the previously measured point 66. Thus, computer controller 24 determines that the previous position of blister strip 14 within guide 12 corresponds to the maximum height of blister 18.

The maximum height typically corresponds to the center of blister 18. Computer controller 24 continues to detect the instaneous height and calculates a back slope. Once the front and back slopes are detected, the points at which the respective slopes intersect with base 62 are determined and a blister profile is generated. Computer controller 24 then calculates the distance halfway between the front and back base/slope intersections which represents the actual center of the blister 18.

The profile and height of blister 18 can serve two purposes. First, in terms of quality assurance, the profile and measured maximum height can be compared to a predetermined height in order to determine whether a defect exists in individual blister 18. If blister 18 is not the correct height, blister 18 can affect the operation of the inhaler device for which blister strip 14 is intended. Also, a defective blister can prevent the proper dose of powdered medication from being contained within blister 18, although dispensed properly, if the height of blister 18 is too small.

Figure 5:
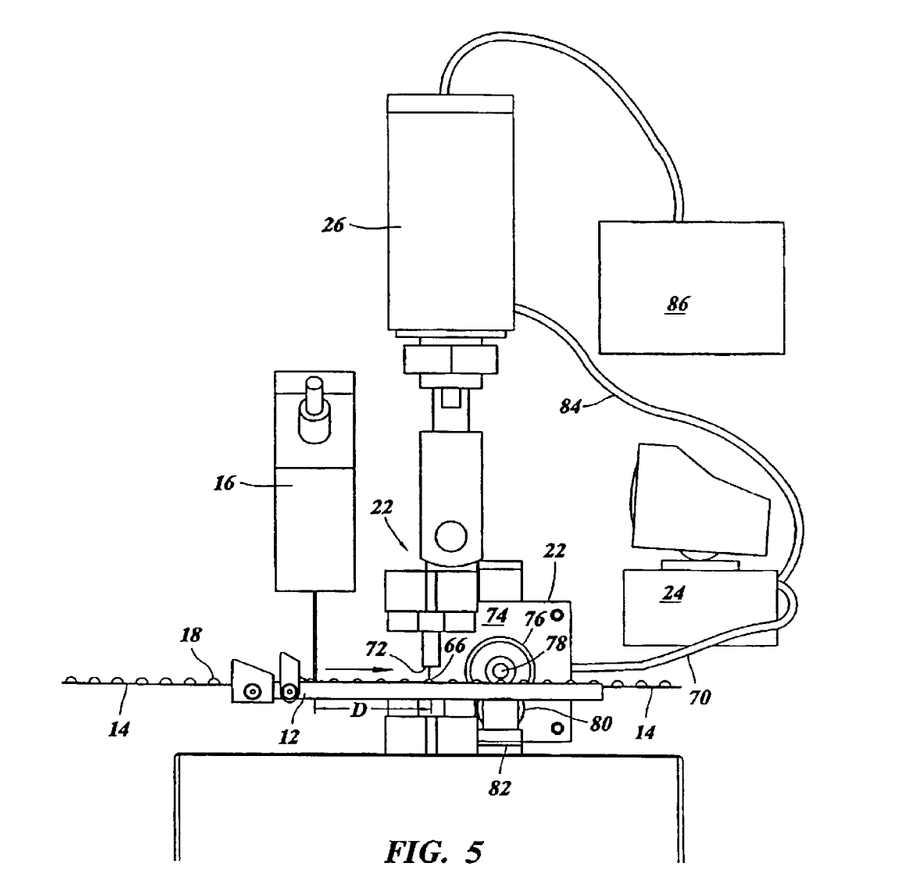
FIG. 5 is a side elevational view of the punch and the drive assembly of the check-weighing system of FIG. 1.

A second purpose for detecting either the profile or maximum height is to advance blister strip 14, as shown in FIG. 5. the proper distance to ensure that blister 18 aligned with punch 20 so that it is punched cleanly by punch 20 and is not broken. If blister 18 becomes broken when punched, powder can be lost, adversely affecting the accurate weighing of the powder medication. The distance D between sensor 16 and punch 20 does not change. Thus, when computer controller 24 detects the center of blister 18, computer controller 24 signals drive assembly 22, via bus 70, to advance blister strip 14 through guide 12 such that blister 18 is centered with and in alignment with a punch tip 72. Drive assembly 22 can include a motor 74 such as a stepper motor, for example a Model Number ST-0171EBA-E7LN-NNN available from American Precision Industries, Inc. of Amherst, N.Y., to precisely advance blister strip 14 such that peak 66 is aligned with punch tip 72.

A drive wheel 76 is mounted on a motor shaft 78 of motor 74 to advance blister strip 14. There can also be provided a friction wheel 80 that urges blister strip 14, via spring 82, into contact with drive wheel 76 to ensure proper engagement of drive wheel 76 and blister strip 14. Spring 82 can include a number of different type of springs such as bent washer springs, coiled springs, leaf springs and the like, as will be readily apparent to those skilled in the art. Accordingly, blister strip 14 is sandwiched between drive wheel 76 and friction wheel 80 so that every rotation of motor 74 is translated into movement of blister 18 toward punch 20. Proper translation of blister strip 14 ensures proper alignment of peak 66 with punch tip 72. Once peak 66 of blister 18 is in alignment with punch tip 72, computer controller 24 signals punch actuator 26 via bus 84 to drive punch 20 such that punch tip 72 punches blister 18 cleanly from blister strip 14 without breaking blister 18.

Actuator 26 can be a fluid driven actuator such as a hydraulic or air cylinder. In one embodiment of the present invention actuator 26 includes a pneumatic air cylinder, Model Number M-120.5-LS available from Bimba Manufacturing Company, New Britain, Conn. Air for operating actuator 26 is supplied by an air compressor 86 via hose 88. Actuator 26 could also include a hydraulic actuator. However, a fluid driven actuator is not a necessary limitation to the invention as punch 20 can also be gear driven, for example by worm or tooth gears, or driven by a motor and fly wheel assembly, as will be readily apparent to those skilled in the art.

Figure 6:
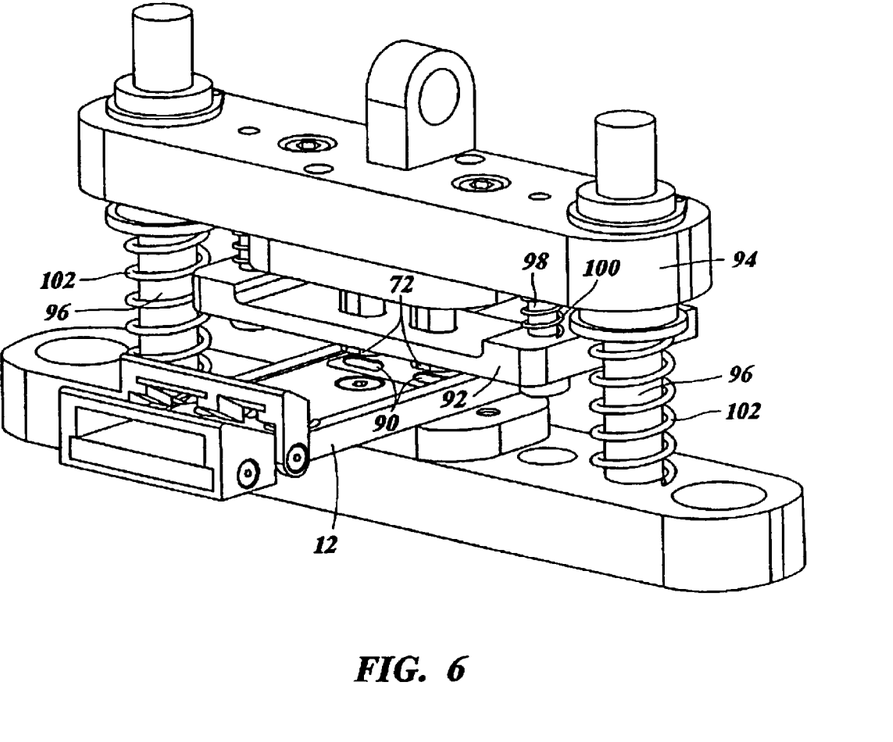
FIG. 6 is an enlarged three dimensional view of the guide and the punch of the check-weighing system of FIG. 1.

In order to ensure a clean punch, the tolerance between punch tip 72 and a die 90, shown in FIG. 6, must be tight. If blister 18 is not cleanly punched from blister strip 14, blister 18 will essentially be torn from blister strip 14 which will vary the foil and paper weight from blister to blister and thus can adversely affect the weight determination of the powder within blister 18.

To further assist in obtaining a clean punch, punch 20 can include a hold down clamp 92. As actuator 26 drives punch top 94, containing punch tip 72, toward blister strip 14 along punch guide supports 96, hold-down clamp 92, for example a stripper plate, engages blister strip 14 within guide 12 to firmly hold blister strip 14 in place as punch tip 72 punches blister 18 from blister strip 14. Hold-down clamp 92 slides on a pair of clamp guides 98 extending downwardly from punch top 94. Springs 100 about clamp guides 98 urge hold down clamp 92 away from punch top 94 so that hold down clamp 92 engages bliste strip 14 before punch tip 72. Punch tip 72 can also be slightly angled, for example one half degree, so that tip 72 does not engage blister strip 14 all at once as is well known in the art.

Actuator 26, such as the air cylinder described above, typically includes internal return springs, not shown, such that when power to system 10 is interrupted, for example in the event of an emergency, punch 20 will return to a neutral position. However, return springs 102 can also be provided to return punch 20 to a neutral position, i.e., in the retracted or up position.

Figure 7:
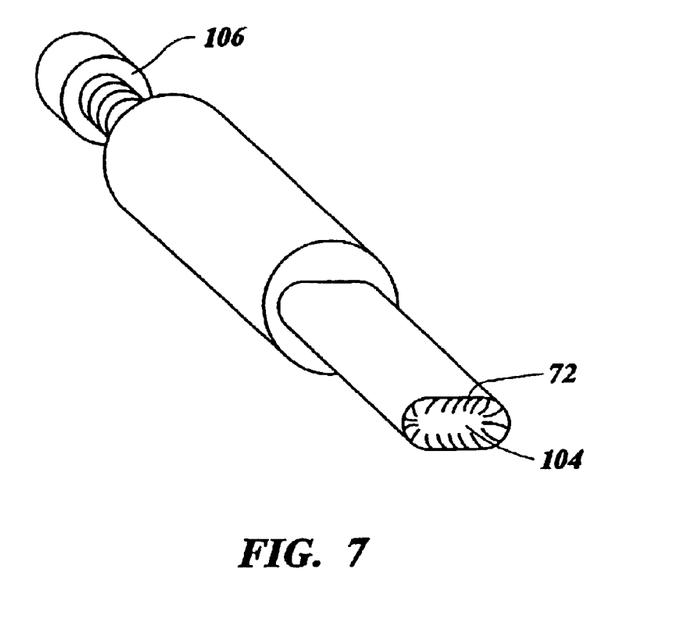
FIG. 7 is an enlarged three dimensional view of the punch tip of FIG. 6 in which the tip is contoured to seat an individual blister.

In order to assist in proper alignment of peak 66 of blister 18 with punch tip 72, punch tip 72, as shown in FIG. 7, can include a contour 104. For example, contour 104 can include a concave surface for receiving blister 18 to properly seat blister 18 within punch tip 72. Moreover, by adjusting the point in time at which hold down clamp 92, FIG. 6, engages blister 18 and exerts pressure on blister strip 14, contour 104 can properly seat a slightly misaligned blister 18 within punch tip 72 before blister strip 14 is firmly held within guide 12. Punch tip 72 can be removably mounted within punch top 94, for example with threaded bolt 106, so that when punch tip 72 becomes dull it can easily be replaced. The ability to remove punch tip 72 from punch top 94 can also be useful to enable the selection of differently shaped punch tips 72 to accommodate differently profiled blisters 18.

Figure 8:
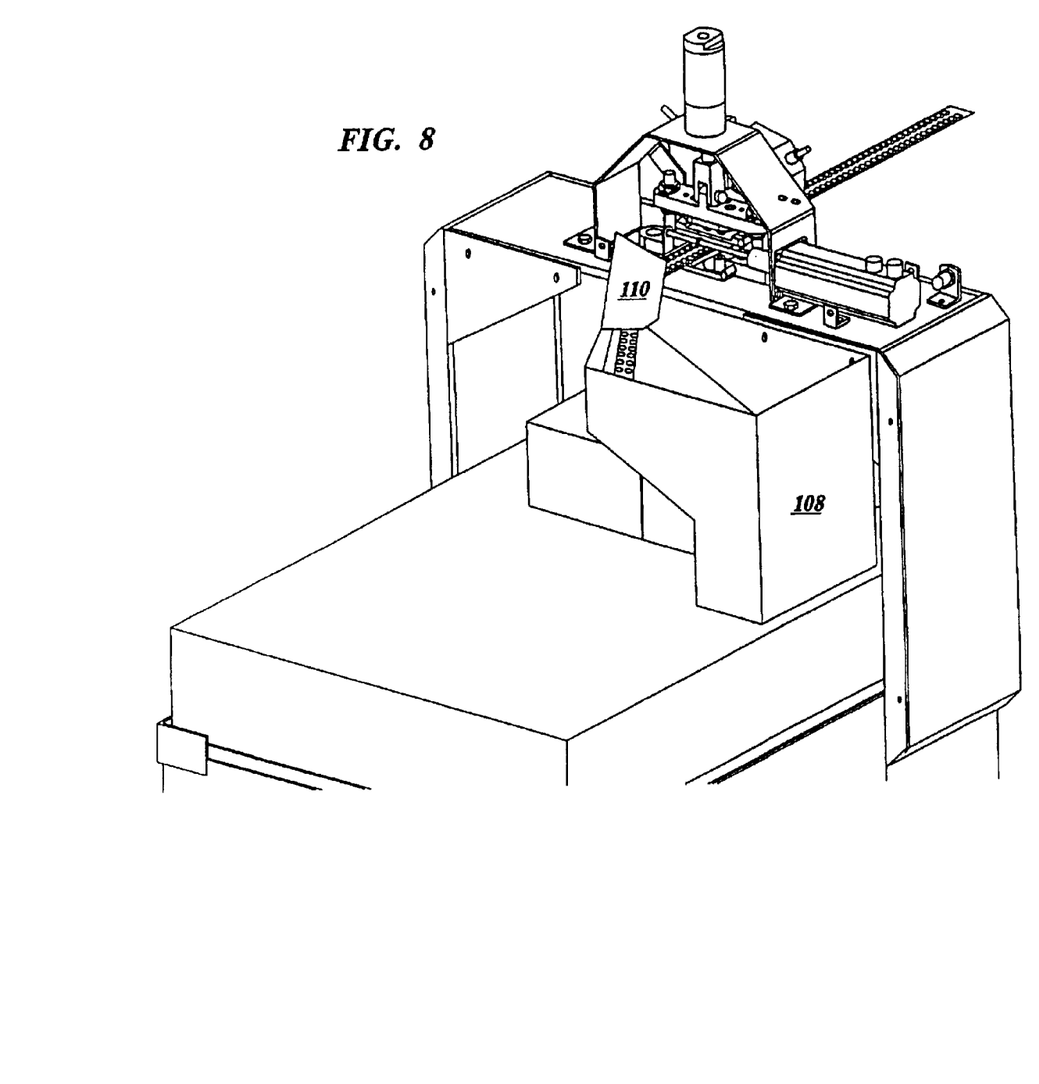
FIG. 8 is a three dimensional view, similar to FIG. 1, of the check-weighing system according to the present invention including a hopper for deflecting and catching a punched blister strip.

As shown in FIG. 8, there is a hopper 108 for receiving punched blister strips 14'. Deflector 110 directs punched blister strip 14' into hopper 108 as motor 74 continues to advance blister strip 14 through guide 12.

Figure 9:
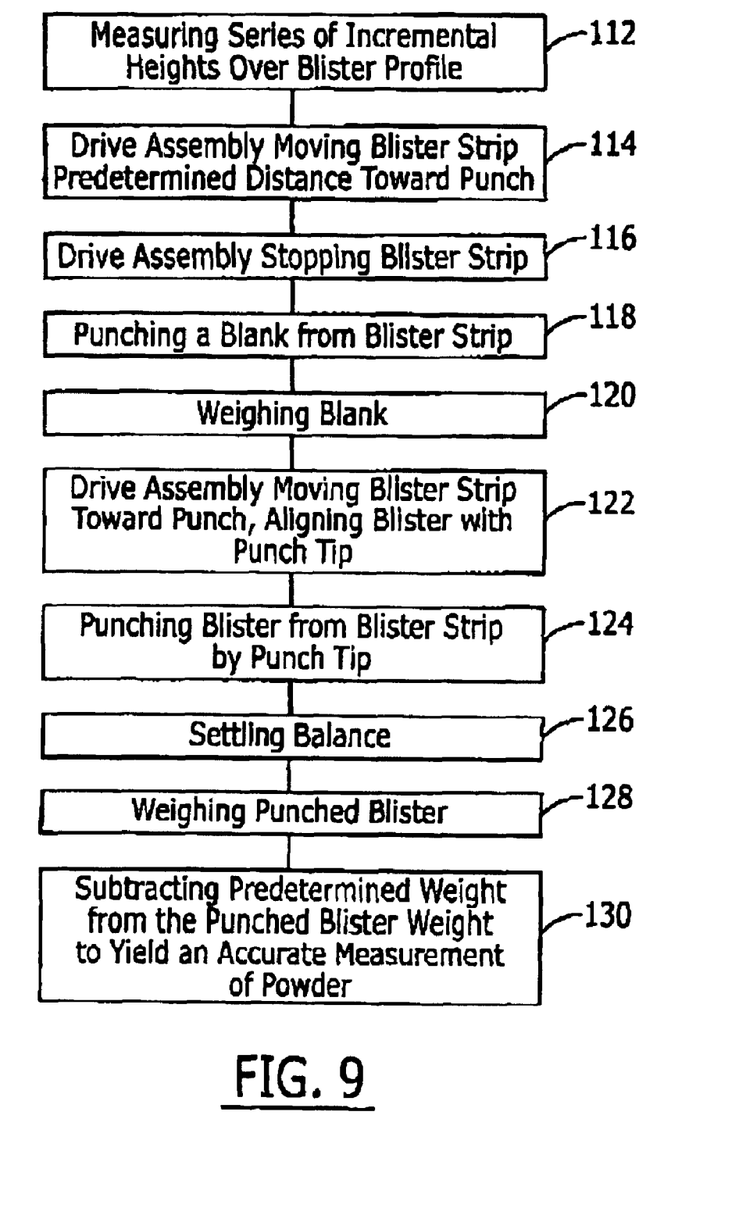
FIG. 9 is a flow chart of the method of weighing a metered dose of medication within a blister strip blister according to the present invention.

While computer controller 24 can precisely integrate sensor 16, drive assembly 22, actuator 26, punch 20 and balance 32, the novelty of the present invention is also realized in the method in which computer controller 24 check-weighs medical powder blister strip blisters. Referring now to FIG. 9, there is represented the method in which computer controller 24 carries out the check-weighing procedure of the present invention.

As shown in FIG. 9, a series of incremental heights over the profile of a blister 18 are measured by sensor 16 (Block 112) by directing a beam of energy 48 at blister strip 14 and receiving reflected energy 52 as blister 18 passes through beam 48. These measurements are used to define the profile of blister 18, and can also be used to determine the maximum height of blister 18.

The incremental heights are used to calculate the front and back slopes of blister 18, and the point where the slopes intersect base 62 are determined. The midpoint between the respective intersections connotes the center of blister 18. Alternatively, while less reliable, the maximum height of blister 18 can be detected and used to connote the center of blister 18. The detected maximum height can also be compared to a predetermined height to detect defects in blister 18. If the height is greater or less than the predetermined height, the blister is defective. Drive assembly 22 then moves blister strip 14 a predetermined distance toward punch 20 (Block 114) based on the detected center of blister 18. Where blister 18 is the first blister detected on blister strip 14, drive assembly 22 stops blister strip 14 (Block 116) and punches a blank from blister strip 14 (Block 118). The blank is weighed by balance 32 (Block 120) to get the predetermined weight representing the composite foil material containing blister 18. Once the blank has been weighed, drive assembly 22 moves blister strip 14 toward punch 20, aligning blister 18 with punch tip 72 (Block 122). Blister 18 is punched from blister strip 14 (Block 124) by punch tip 72 and balance 32 is allowed to settle (Block 126). Once balance 32 has settled punched blister 18' is weighed (Block 128). After punched blister 18' is weighed, the predetermined weight is subtracted from the punched blister weight (Block 130) to yield an accurate measurement of the powder contained within blister 18.

Thus, the method and system according to the present invention provide an effective way to very accurately check-weigh powdered medication blister strips without having to make assumptions or otherwise account for lost percentages of powder as in the prior art method. Also, individual blisters can be weighed to determine at what point in a processing run the dosage became inaccurate.

It will be understood that various details of the invention may be changed without departing from the scope of the invention. Furthermore, the foregoing description is for the purpose of illustration only, and not for the purpose of limitation—the invention being defined by the claims.

What is claimed is:

1. A system for check weighing the content of a blister strip blister comprising:
    (a) a guide adapted to receive a blister strip comprised of at least one blister containing a content of powder therein;
    (b) a punch aligned with the guide for receiving the at least one blister containing a content of powder therein;
    (c) an actuator engaged with the punch for driving the punch toward the blister strip, whereby the blister containing a content of powder therein is punched from the blister strip;
    (d) a balance adapted to receive the punched blister for weighing the punched blister and generating a punched blister weight for the at least one blister containing a content of powder therein; and
    a controller, responsive to the balance, for subtracting a predetermined weight from the punched blister weight to yield the weight of the content of powder contained in the at least one blister.

2. The check-weighing system of claim 1, further including a drive assembly, responsive to the blister strip, for advancing the at least one blister towards the punch.

3. The check-weighing system of claim 2 in which the drive assembly includes a drive wheel adapted to engage a first side of the blister strip for advancing the at least one blister toward the punch.

4. The check-weighing system of claim 3 which the drive assembly further includes a friction wheel adapted to engage a second side of the blister strip opposite the first side for urging the blister strip towards the friction wheel.

5. The check-weighing system of claim 4 in which the drive assembly further includes a motor, responsive to the controller, for engaging the drive wheel to advance the at least one blister a predetermined distance toward the punch.

6. The check-weighing system of claim 5 in which the controller includes a computer processor.

7. The check-weighing system of claim 5 in which the motor comprises a stepper motor for advancing the blister strip the predetermined distance.

8. The check-weighing system of claim 2 further including a sensor, aligned with the guide and responsive to the at least one blister, for detecting a center of the at least one blister.

9. The check-weighing system of claim 8 in which the sensor includes an energy source for directing a beam of energy toward the blister strip, the sensor receiving a beam of reflected energy from the blister strip.

10. The check-weighing system of claim 9 in which the energy source includes a light source.

11. The check-weighing system of claim 10 in which the light source includes a laser.

12. The check-weighing system of claim 8 in which the guide includes a spring for urging the blister strip toward the guide.

13. The check-weighing system of claim 9 in which the guide further includes a passageway adapted to receive the beam of energy for preventing a reflected beam in the absence of a blister strip.

14. The check-weighing system of claim 1 in which the punch includes a clamp, responsive to the actuator, for holding the blister strip within the guide as the blister is being punched form the blister strip.

15. The check-weighing system of claim 14 in which the punch includes a concave tip for seating the blister within the punch as the blister is being punched from the blister strip.

16. The check-weighing system of claim 15 in which the tip engages the blister strip at an oblique angle.

17. The check-weighing system of claim 1 in which the actuator comprises a fluid driven actuator.

18. The check-weighing system of claim 17 in which the fluid driven actuator comprises an air cylinder.

19. A system for check-weighing the content of a blister strip blister comprising:
    (a) a guide adapted to receive a blister strip comprised of at least one blister containing a content of powder therein;
    (b) a punch aligned with the guide for receiving the at least one blister containing a content of powder therein;
    (c) an actuator engaged with the punch for driving the punch toward the blister strip, whereby the blister is punched from the blister strip containing a content of powder therein;
    (d) a balance adapted to receive the punched blister for weighing the punched blister and generating a punched blister weight for the at least one blister containing a content of powder therein;

(e) a drive assembly responsive to the blister strip for advancing the at least one blister containing a content of powder therein toward the punch; and (f) a controller, responsive to the balance, for subtracting a predetermined weight from the punched blister weight to yield the weight of the content of powder contained in the at least one blister.

20. The check-weighing system of claim 19 in which the drive assembly includes a drive wheel adapted to engage a first side of the blister strip for advancing the at least one blister toward the punch.

21. The check-weighing system of claim 20 in which the drive assembly further includes a friction wheel adapted to engage a second side of the blister strip opposite the first side for urging the blister strip towards the friction wheel.

22. The check-weighing system of claim 21 in which the drive assembly further includes a motor, responsive to the controller, for engaging the drive wheel to advance the at least one blister a predetermined distance toward the punch.

23. The check-weighing system of claim 22 in which the controller includes a computer processor.

24. The check-weighing system of claim 22 in which the motor comprises a stepper motor for advancing the blister strip the predetermined distance.

25. The check-weighing system of claim 19 further including a sensor, aligned with the guide and responsive to the at least one blister, for detecting a center of the at least one blister.

26. The check-weighing system of claim 25 in which the sensor includes an energy source for directing a beam of energy toward the blister strip, the sensor receiving a beam of reflected energy from the blister strip.

27. The check-weighing system of claim 26 in which the energy source includes a light source.

28. The check-weighing system of claim 27 in which the light source includes a laser.

29. The check-weighing system of claim 19 in which the guide includes a spring for urging the blister strip toward the guide.

30. The check-weighing system of claim 26 in which the guide further includes a passageway adapted to receive the beam of energy for preventing a reflected beam in the absence of a blister strip.

31. The check-weighing system of claim 19 in which the punch includes a clamp, responsive to the actuator, for holding the blister strip within the guide as the blister is being punched form the blister strip.

32. The check-weighing system of claim 31 in which the punch includes a concave tip for seating the blister within the punch as the blister is being punched from the blister strip.

33. The check-weighing system of claim 32 in which the tip engages the blister strip at an oblique angle.

34. The check-weighing system of claim 19 in which the actuator comprises a fluid driven actuator.

35. The check-weighing system of claim 34 in which the fluid driven actuator comprises an air cylinder.

36. A method for weighing the content of a blister in a blister strip, the method comprising the steps of:

(a) punching a blister containing a metered content of powder from a blister strip;

(b) weighing the punched blister to determine a punched blister weight; and (c) subtracting from the punched blister weight a predetermined weight representing the weight of an empty blister to determine a weight representative of the metered powder content.

37. The method of claim 36 which the step of punching includes punching the blister from the blister strip without breaking the blister.

38. The method of claim 36 further including the steps of punching a blank from the blister strip and weighing the blank to produce the predetermined weight.

39. The method of claim 36 further including the step of determining the profile of the blister prior to punching the blister.

40. The method of claim 39 further comprising the step of detecting the center of the blister to facilitate alignment of the blister for punching.

41. The method of claim 40 which the step of detecting the center includes calculating a first slope of a first blister side and a second slope of a second blister side to generate a blister profile.

42. The method of claim 41 in which the step of detecting the center further includes detecting the midpoint of the blister profile.

43. A method for weighing the content of a blister in a blister strip, the method comprising the steps of:

(a) punching a blister containing a metered powder content from a blister strip without breaking the blister;

(b) weighing the punched blister to determine a punched blister weight; and (c) subtracting from the punched blister weight a predetermined weight representing the weight of an empty blister to determine a weight representative of the metered powder content.

44. The method of claim 43 further including the steps of punching a blank from the blister strip and weighing the blank to produce the predetermined weight.

45. The method of claim 43 further including the step of measuring a series of incremental heights of a profile of the blister prior to punching the blister to define the profile of the blister.

46. The method of claim 45 further comprising the step of calculating the center of the blister to facilitate alignment of the blister for punching.

47. The method of claim 46 in which the step of detecting the center includes calculating a first slope of a first blister side of the profile and a second slope of a second blister side of the profile.

48. The method of claim 47 in which the step of detecting the center further includes detecting the midpoint of the blister profile.

49. A method for detecting defects in a blister of a blister strip, the method comprising the steps of:

(a) directing, from an energy source, a beam of energy toward a blister strip containing at least one blister containing a content of powder therein;

(b) moving the blister strip in alignment with the beam of energy such that the at least one blister containing a content of powder thereinpasses through the beam of energy;

(c) receiving reflected beams of energy from the blister strip;

(d) determining from the reflected beams of energy the maximum height of the at least one blister containing a content of powder therein; and (e) comparing the maximum height to a predetermined height.

50. A method for aligning a blister of a blister strip with a punch, the method comprising the steps of:

(a) directing, from an energy source, a beam of energy toward a blister strip containing at least one blister containing a content of powder therein;

(b) moving the blister strip in alignment with the beam of energy such that the at least one blister passes through the beam of energy;

(c) receiving reflected beams of energy from the blister strip;

(d) detecting from the reflected beams of energy the center of the at least one blister containing a content of powder therein; and (e) moving the blister containing a content of powder therein, in response to the detected center, a predetermined distance toward a punch whereby the blister is aligned with the punch.

51. The method of aligning a blister of claim 50 in which the step of detecting the center includes calculating a first slope of a first side of the blister and a second slope of a second side of the blister to generate a blister profile.

52. The method of claim 51 in which the step of detecting the center further includes detecting the midpoint of the blister profile.

53. The method of claim 50 in which the step of detecting the center includes detecting the maximum height of the blister.

54. A system for aligning a blister of a blister strip with a punch comprising:

(a) an energy source for directing a beam of energy toward a blister strip containing at least one blister containing a content of powder therein;

(b) a drive assembly for moving the blister strip in alignment with the beam of energy such that the at least one blister passes through the beam of energy;

(c) a detector for receiving reflected beams of energy from the blister strip; and (d) means for detecting from the reflected beams of energy the center of the at least one blister containing content of powder therein wherein the drive assembly, in response to the detected center, moves the blister containing a content of powder therein a predetermined distance toward a punch whereby the blister containing a content of powder therein is aligned with the punch.

55. The system of claim 54 in which the means for detecting the center includes means, responsive to the detector, for calculating a first slope of a first side of the blister and a second slope of a second side of the blister to generate a blister profile.

56. The system of claim 55 in which the means for detecting the center further includes means, responsive to the means for calculating, for determining the midpoint of the blister profile.

57. The system of claim 54 in which the means for detecting the center includes means, responsive to the detector for detecting the maximum height of the blister.

58. The check-weighing system of claim 1, wherein the powder comprises a metered dose of medication.

59. The check-weighing system of claim 19, wherein the powder comprises a metered dose of medication.

60. The method of claim 36, wherein the powder comprises a metered dose at medication.

61. The method of claim 43, wherein the powder comprises a metered dose of medication.

* * * * *